United States Patent [19]

Pearlman et al.

[11] Patent Number: 4,649,323
[45] Date of Patent: Mar. 10, 1987

[54] MICROCOMPUTER-CONTROLLED LIGHT SWITCH

[75] Inventors: Gordon W. Pearlman; Steven B. Carlson, both of Portland, Oreg.

[73] Assignee: Lightolier Incorporated, Jersey City, N.J.

[21] Appl. No.: 724,015

[22] Filed: Apr. 17, 1985

[51] Int. Cl.[4] .............................................. H05B 37/02
[52] U.S. Cl. ..................................... 315/307; 315/292; 315/293; 315/362
[58] Field of Search ................. 315/307, 292, 293, 362

[56] References Cited

U.S. PATENT DOCUMENTS

| | | | |
|---|---|---|---|
| 3,668,467 | 6/1972 | Isaac | 315/292 |
| 3,706,914 | 12/1972 | Van Buren | 315/316 |
| 3,766,431 | 10/1973 | Isaacs | 315/292 |
| 3,805,096 | 4/1974 | Hamilton | 315/292 |
| 3,968,401 | 7/1976 | Bryant | 315/293 |
| 4,240,011 | 12/1980 | Dinges | 315/292 |
| 4,241,295 | 12/1980 | Williams | 315/294 |
| 4,287,468 | 9/1981 | Sherman | 315/DIG. 4 |
| 4,289,972 | 9/1981 | Wern | 315/362 |
| 4,359,670 | 11/1982 | Hosaka et al. | 315/307 |

Primary Examiner—Harold Dixon
Attorney, Agent, or Firm—Chernoff, Vilhauer, McClung & Stenzel

[57] ABSTRACT

A light level controller includes a microcomputer controlled light switch which responds to a manual tap or a longer manual depression of the switch in order to initiate various control modes for a light source. Preset levels of light intensity may be stored in the microcomputer's memory and an automatic fade mode may be initiated to cause the level of light intensity to fade from a current level to a preset level at a pre-established rate. The controller may respond to the momentary depression of the switch to initiate the automatic fade mode or if tapped while a fade is in progress it may cause the light source to make an abrupt transition to either full on or full off, depending on whether a higher or lower level of light intensity is desired. A depression of the switch for a period longer than a tap will cause the level of light intensity to continue to change until the switch is released, and simultaneously this level will be stored in memory.

21 Claims, 8 Drawing Figures

MICROCOMPUTER-CONTROLLED LIGHT SWITCH

BACKGROUND OF THE INVENTION

The present invention relates to a manually operated switch such as a wall-mounted light switch for controlling the level of light intensity from a light fixture and more particularly to a light level controller actuated by the switch which includes a microcomputer for initiating control programs to regulate the level of light intensity.

Wall-mounted light switches which include a dimmer have become increasingly popular especially for residential applications where it is desired to precisely control the level of light intensity in a particular room. Such light switches usually include a variable resistor which is manually manipulated to control the voltage input to the light, where the variable resistor is connected in series with the household AC power line. A desirable feature in such switches would be the ability to return to predetermined levels of light intensity from conditions of either full power on or full power off. At present, however, such switches have no such memory and formerly established light intensity levels may be reestablished only by manual operation and guesswork.

There are in existence, however, touch actuated dimmer controls which cycle through a dim to a bright cycle and back again, and include a memory function such that removing the hand from the switch will stop the cycle and store the level of light intensity at that point in memory. A subsequent touch will turn the light off and yet a further touch will return the light to its previous intensity level based upon the value of the intensity level stored in memory. While an improvement over the manually-operated variable-resistor type of dimmer, this dimmer may require the user to manually cycle through a complete cycle of dim light to bright light to arrive at a desired intensity level. This latter switch is known as a DECORA® touch dimmer and is manufactured by Leviton Manufacturing Company, Inc. of Littleneck, N.Y. The DECORA® touch dimmer, however, lacks the versatility needed for certain aesthetic effects such as an automatic gradual fade from one light level to another. Moreover, it cannot change the direction, that is, either the increasing (up) or the decreasing (down), of light intensity from one direction to another without completing a full cycle from dim to bright and back again. Also, the touch dimmer has no "remote" capability that would enable one to use its features from a remote location such as a hallway or another room. Full function remotes are common with ordinary two-position light switches, but have not been available for dimmers because of the complexity of the circuitry.

Yet another touch-type light control is shown in Hamilton, U.S. Pat. No. 3,805,096, and in Hosaka, et al., U.S. Pat. No. 4,359,670. These devices are responsive to the duration of touch for initiating various control functions but include no provision for automatically fading light from one level to another.

Automatic fading has in the past been available only in theatrical lighting systems employing very complicated switching inputs such as keyboard commands or elaborate banks of switches. Examples of such systems are shown in Williams, U.S. Pat. No. 4,241,295; Dinges, et al., U.S. Pat. No. 4,240,011; Van Buren, U.S. Pat. No. 3,706,914; and Isaacs, U.S. Pat. Nos. 3,766,431 and 3,668,467.

SUMMARY OF THE INVENTION

The present invention provides a highly versatile microcomputer-controlled light level intensity switch which is operated by a pair of non-latching switches which provide inputs to the microcomputer. The non-latching switches may be arranged as upper and lower switches on a rocker panel or independent pair of panels which are normally biased to remain in a neutral position. The switches are each connected in series with the AC mains power line so that when either switch is depressed a signal in the form of a series of sequential pulses is provided to the microcomputer.

When the switch is depressed in either the up or down direction, the microcomputer first determines whether the depression of the switch is momentary, that is, a brief tap, or whether it is being held down for a period of more than transitory duration. When the switch is held, the microcomputer advances the level of light intensity in the direction indicated by the switch, that is, either towards bright or towards dim. When the switch is subsequently released the microcomputer stores that current level of light intensity as a "preset" level in its memory. If the switch is first tapped in either direction with the light intensity at some static level the microcomputer will cause the level of light intensity to automatically advance or "fade" towards a predetermined level, either "full on," "off," or "preset." The fade may occur at a rate which can be programmed in the microcomputer. If desired, the speed of the fade may vary depending upon whether the fade is from dim to bright or vice versa. For example, it is possible to program all downward fades to occur more gradually than all upward fades. If the switch is tapped again while the light intensity is fading towards the preset level, the microcomputer will halt the fade and cause the light intensity level to abruptly shift to the preset level. If the "up" switch is tapped with light at the preset level, the light intensity will fade to full maximum. If it is tapped in the downward position when the light intensity level is at the preset position the light intensity will fade towards zero. Thus, the microcomputer interprets the character of the command, that is, a hold or a tap, determines the current control mode, and initiates a light intensity control function accordingly. The three types of programs are preset, automatic fade, and abrupt transition.

The non-latching switches provide a pulse input, which is derived from the AC power source, to the light switch through a clamp and half-wave rectifying network. Thus, the input to the microcomputer is a series of square wave pulses. The microcomputer has an internal program which counts the number of a sequential series of pulses to determine if the switch is being tapped or held and executes a control program mode accordingly.

The microcomputer is connected to a source of light such as an incandescent light bulb of between 40 and 2,000 watts by means of a thyristor solid state switch. The thyristor controls power to the incandescent light source by turning on at a predetermined phase angle relative to the phase of the AC line source. For this purpose the thyristor is responsive to a timed firing signal generated by the microcomputer according to the program in operation. The firing signal is synchronized with the incoming power supply line by a zero crossing detector which detects the transition in the AC power line from positive to negative. The microcomputer receives the zero crossing information and synchronizes this information with its internal clock which controls the timing of the firing signal for the thyristor. In this way the timing of the thyristor firing signal is calibrated to the desired level of light intensity and represents a phase angle at which the AC line is gated into the incandescent light source.

When either the "up" or "down" switch is held the computer first determines the current level of light intensity. The microcomputer then causes the level of light intensity to increase for "up" or decrease for "down" in predetermined increments by initiating thyristor firing signals which either advance the phase gating of the AC wave or retard it. As long as either switch is held "on," the level of light intensity will gradually advance or decline. Each time an additional increment of light intensity is added it replaces the current level in the memory which continues to be sampled in a closed-loop fashion until the switch is released. When the switch is released the current level of light intensity is stored in memory as a "preset" level.

When either switch is tapped the microcomputer interrogates memory to find out if the current level is equal to the preset level. This determines whether a fade is in progress or whether the light intensity is not changing. The subsequent control modes, "fade" and "abrupt transition," then depend upon whether the new level in memory is preset, full on, or full off, and whether the current level is higher than, lower than, or equal to this level.

The switches are wired in line with the main 120-volt AC line. Since the switches are at all times either "on" or "off" and there are no variable resistors used for the dimming function, a parallel set of remote switches, also wired in line with the AC line, may be provided to give full remote capability. Thus, another switch box may be provided in a hallway or adjacent room which fully duplicates the functions of the primary switch box without the necessity for duplication of the microcomputer and its associated circuitry. The remote switches are wired in parallel with the primary switches through their wall-mounted switch box forming a second parallel input to the microcomputer.

A primary object of this invention is to provide a light level controller which provides a maximum degree of flexibility in altering levels of light intensity according to the desires of the user.

A further object of this invention is to provide a light level controller which includes an automatic fader for gradually fading the light intensity level from a current level to a preset level.

Yet a further object of this invention is to provide a light level controller having means for manually overriding the automatic fader and for making abrupt transitions in light level intensity from a current level to a predetermined level.

A still further object of this invention is to provide a light level controller having the above features which can be mounted within a standard wall switch panel box and connected to a standard 60-cycle AC household power supply.

Yet a further of this invention is to provide a light level controller in a wall switch mounting which is microcomputer-controlled and responsive to the state of non-latching switches which provide a digital input signal to the microcomputer.

A still further object of this invention is to provide a light level controller having a plurality of light control modes in which the particular mode chosen is a function of the period of time that the non-latching control switch is pressed.

A further object of this invention is to provide a light level controller in a wall switch mounting having a visual indication of the intensity of the light on the room.

A still further object of this invention is to provide a wall-mounted light level controller having full remote capability.

The foregoing and other objectives, features and advantages of the present invention will be more readily understood upon consideraton of the following detailed description of the invention taken in conjunction with the accompanying drawings.

DETAILED DESCRIPTION OF THE INVENTION

Figure 1:
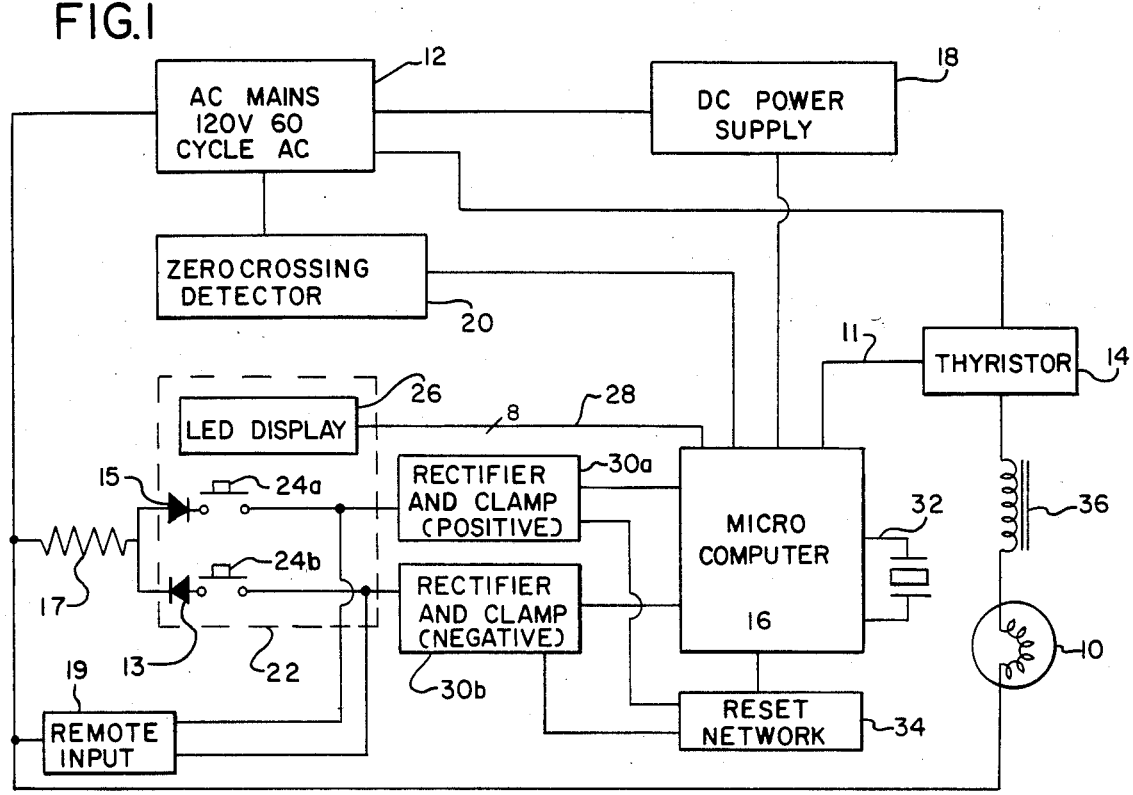
FIG. 1 is a schematic block diagram of a circuit constructed according to the present invention.

A light source 10 which may be, for example, an incandescent light source drawing between 40 and 2,000 watts of power, is connected to a source of AC power 12 through a thyristor 14. The AC source 12 is a standard household power supply, 60-cycle, 120-volt AC. The thyristor 14 is a bi-directional SCR controller. The control line 11 for the thyristor 14 is connected to a microcomputer 16. The microcomputer 16 is powered by a DC power supply 18 and includes an input from a zero crossing detector 20 which is also connected to AC power source 12. A wall switch mounting 22 (enclosed within the dotted line in FIG. 1) may include a pair of nonlatching switches 24a and 24b and an LED display 26. The LED display may be connected to the microcomputer 16 by a bus 28 which may include any desired plurality of lines. In the example shown in FIG. 1, line 28 is an eight line bus. Each of the nonlatching switches 24a and 24b includes a rectifier and clamp circuit 30a and 30b, respectively, which provide half-wave rectification and voltage clamping. The switches 24a and 24b are connected to AC power source 12 through a resistor 17 and diodes 13 and 15. The output of the rectifier and clamp circuits 30a and 30b are connected as inputs to microcomputer 16. Microcomputer 16 also includes a clock which may, for example, be a crystal oscillator 32. The microcomputer 16 also includes as an input, a reset network 34. A remote input 19 may also be provided as a parallel input to circuts 30a and 30b. Remote input 19 is in all respects identical to the network of switches 24a and 24b including resistor 17 connected to the AC line and diodes 13 and 15. Thus, either the wall mounting 22 or the remote input 19 may initiate the functions discussed herein.

Between thyristor 14 and light source 10 there is a choke or induction coil 36 which provides current damping for the light source 10. Without such a choke 36 the filament in an incandescent light source such as light source 10 may physically oscillate under certain conditions. Thyristor 14 has an output comprising AC pulses having relatively fast rise times. The choke 36 smooths the shape of these pulses so that there is no ringing or spurious oscillation within the light source 10.

The input of the microcomputer 16 from the rectifier and clamp circuits 30a and 30b is responsive to a series of sequential square wave pulses. These pulses are developed from the line inputs through either switch 24a or 24b. For example, if switch 24a is depressed the line voltage is fed to rectifier and clamp circuit 30a which provides half-wave rectification and clamps the voltage peaks to a level compatible with the microcomputer inputs, that is approximately 5 volts. The switches 24a and 24b are arranged to provide "up" and "down" light level changes, respectively. A detailed functional description of the consequence of pressing either switch will be explained below, but, in general, switch 24a increases the brightness level of the light source 10 and may therefore be considered an "up" switch and switch 24b decreases the brightness level of the light source 10 and may therefore be considered a "down" switch. Accordingly, rectifier and clamp circuit 30b provides negative-going square wave pulses as an input to microcomputer 16 and the circuit 30a provides positive-going square wave pulses. The reset network 34 provides a signal that resets the microcomputer 16 upon initial power up of the system irrespective of fluctuation in the DC power supply 18. Such circuits are well known in the electronics art. The zero crossing detector 20 determines the zero crossing points of the input power AC waveform from AC power source 12. This information is synchronized with the crystal oscillator 32 so that the thyristor 14 may be controlled by gating voltage from the AC power source 12 into the light source 10 at predetermined times relative to the zero crossing points.

Microcomputer 16 is a single chip microcontroller which may include read only memory and random access memory. Such a microcontroller is manufactured by National Semiconductor Co. and bears the model number COP413L. The microcomputer 16 receives commands from the rectifier and clamp circuits 30a and 30b, and synchronizes those commands with the zero crossing points of the AC power line by way of a signal from zero crossing detector 20, and provides appropriate firing commands to thyristor 14 over line 11. The programs executed by microcomputer 16 and the method of operating switches 24a and 24b to achieve the programmed results will be explained below.

Figure 4:
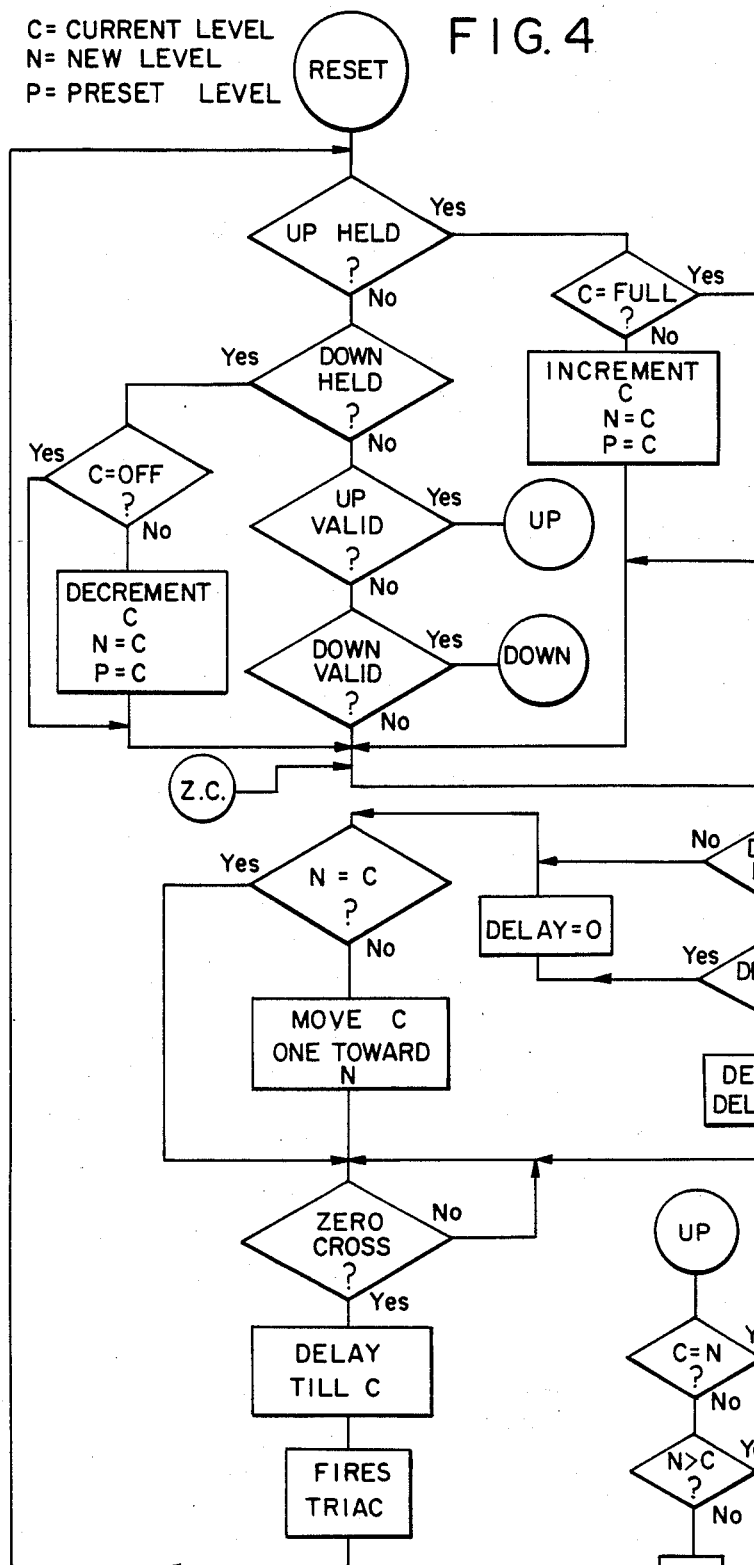
FIG. 4 is a flow chart diagram depicting the method of operation of the circuit illustrated in FIG. 1.
Figure 4B:
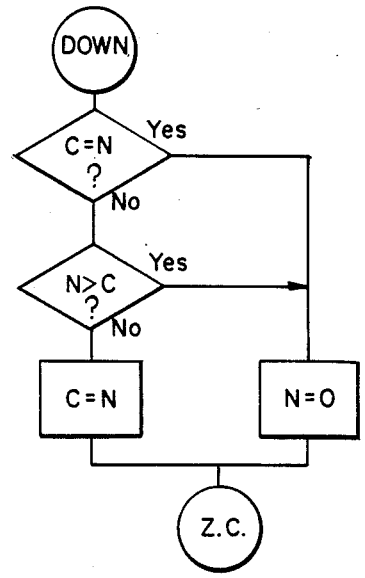
FIG. 4(b) is a further continuation of the flow chart diagram of FIG. 4.
Figure 4A:
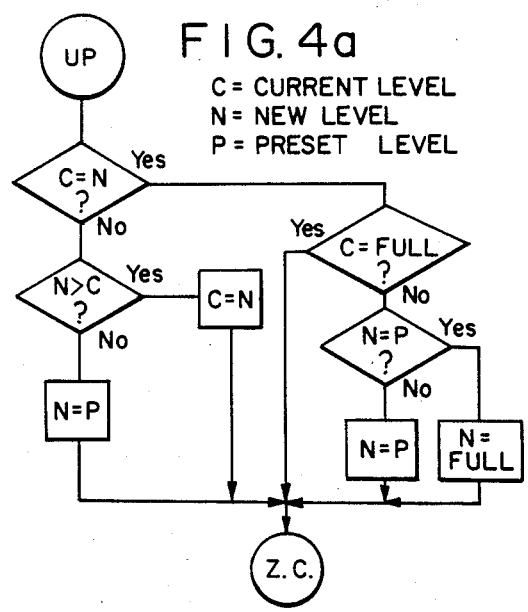
FIG. 4(a) is a continuation of a portion of the flow chart diagram of FIG. 4.

Referring now to the flow chart diagrams of FIGS. 4, 4(a) and 4(b), there are four possible switch conditions for switches 24a and 24b. These are identified as the decision nodes "up held", "down held", "up valid", and "down valid". There also exists the possibility that none of the four above conditions exists and the light will remain at its current level by the continuous completing of the zero crossing ("Z.C.") subroutine, shown in the bottom half of FIG. 4, once every 1/120 second. This subroutine is responsible for generating a firing or command signal over line 11 which controls the phase angle at which the triac fires during each ½ cycle of the 60 cycle AC power input. If desired, the Z.C. subroutine may be executed every other half cycle or every third half cycle. Thus an instruction could be provided in the program to skip a certain number of half cycles before executing the Z.C. subroutine. The effect of such a instruction would be to provide a more gradual automatic fade or preset.

Figure 5:
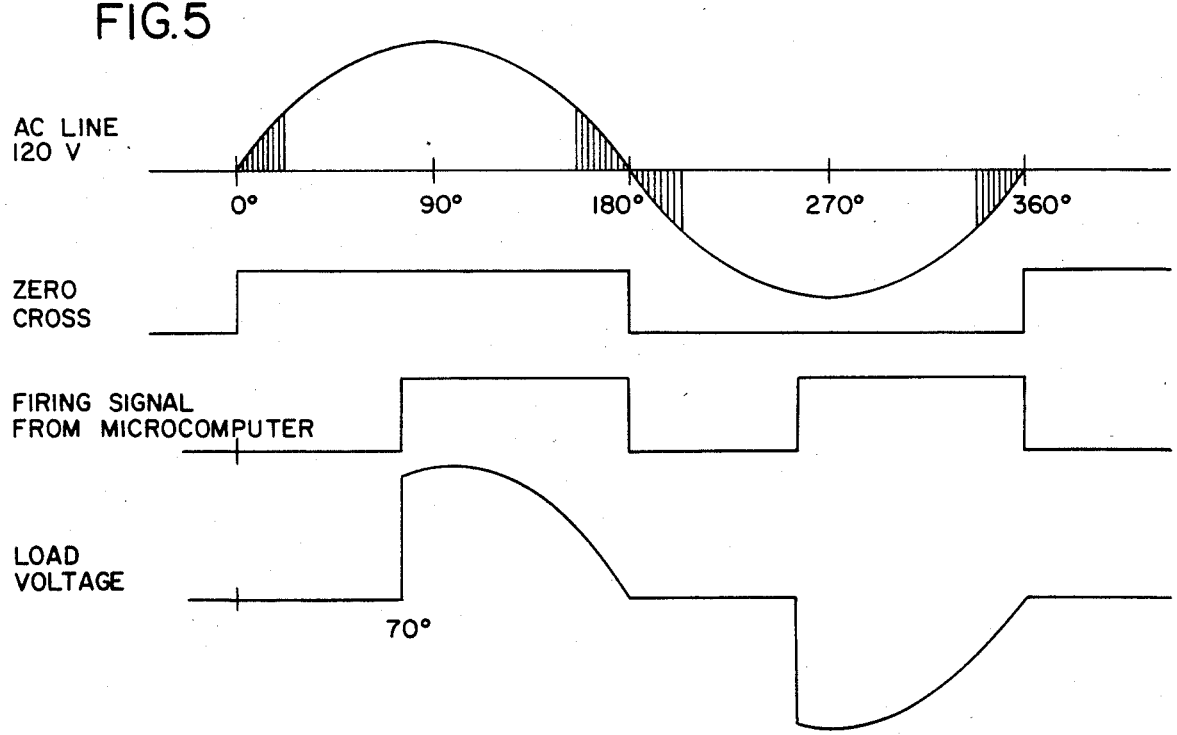
FIG. 5 is a waveform diagram illustrating the method of controlling the line voltage input to a light source using the circuit of FIG. 1

The first step in the zero crossing subroutine is to determine if the current intensity level "C" equals a new or desired intensity level. The new level, indicated by the letter "N," may have one of three values. It may be equal to the "preset" level "full on" or "full off." Thus, in a case where N is equal to C, which would be the case if none of the switch conditions identified in the four decision nodes above currently existed, the microcomputer 16 would determine the time of zero crossing of the AC input wave with reference to its own internal clock. As soon as it is determined that a zero crossing has occurred the microcomputer 16 begins counting until it reaches a point in time in the current half-cycle of the AC wave at which the voltage input will cause the light 10 to have the desired level of light intensity N (FIG. 5). This point in time may be expressed as a phase angle of the line input wave. At the predetermined phase angle the microcomputer will initiate a firing signal which will cause the thyristor 14 to gate the remaining portion of the AC voltage wave into the light source 10. The resultant voltage input which is shown as the "load voltage" line in FIG. 5 is a sharply rising pulse whose power content represents a fraction of the total available AC power line output. The sharply rising input wave form is smoothed by choke 36 to eliminate ringing or oscillation of the filament in the light source 10.

The thyristor 14 is fired once each half cycle and after each firing the microcomputer 16 interrogates the inputs from circuits 30a and 30b to determine the status of switches 24a and 24b. The interrogation sequence and the resulting computations to determine the proper light level occur during a brief period of time at the beginning and at the end of each half cycle of the input waveform as indicated by the shaded portions under the curve of the input wave in FIG. 5. During these periods no firing signal is generated and the thyristor 14 remains off. These are the points in the cycle, however, when the input voltage is lowest and the effect upon power availability is therefore negligible.

The microcomputer 16 determines the status of the switches 24a and 24b based upon the number of sequential square wave pulses counted at each of the switch inputs from circuits 30a and 30b during each sampling period. Depressing either of the switches 24a or 24b will cause circuit 30a or 30b to generate a series of square wave pulses for as long as the switch is depressed. Thus, the number of sequential pulses received is a function of the length of time that the user manually depresses the panel (refer to FIGS. 2 and 3) that actuates the switches 24a and 24b. The microcomputer 16 counts the number of pulses in order to discriminate between a "hold" condition and a "tap" condition. If the microcomputer 16 reads a predetermined number of pulses "n" when it interrogates a switch input it may interpret the condition as a hold, and if it receives a number of pulses greater than a predetermined minimum "m" but less than n it may interpret the switch condition as a "tap." The predetermined minimum is necessary so that the micro-computer will not interpret spurious noise as a valid switch condition.

Referring again to the top of FIG. 4, if n pulses are counted while the input from rectifying and clamp circuit 30a is being sampled the microcomputer 16 determines that the up switch is being held. It then determines whether the current level of light C is at full power or less than full power. If the current level of light C is less than full the microcomputer increments C and simultaneously makes the new level just achieved equal to C and the preset level P equal to C. The zero crossing subroutine is then executed. The result of this loop is that as long as the user continues to depress switch 24a, the microcomputer 16 will cause C to increment one step at a time per half cycle until the switch is released. If switch 24b remains depressed the microcomputer 16 will decrement C simultaneously making N equal to C and P equal to C until the light is either fully off or until the user releases the button controlling switch 24b. The operations N=C and P=C are also memory operations and values of N and P are stored in memory for subsequent operations. The above described loops represent the preset mode of light control and serve to establish a new value in memory for a level of light intensity P at the same time that a new level of light intensity is being established in the light source 10 through the zero crossing subroutine.

If during a sampling period the microcomputer 16 discovers a "tap" condition on the "up" switch 24a, it executes the computational routine shown in FIG. 4(a). First the microcomputer 16 determines if the current level of light intensity equals the new or desired level of light intensity N. N could be the preset level stored in memory or could be a level corresponding to full power on. If C=N, the microcomputer 16 then determines whether C=full power. If yes, the zero crossing subroutine is executed. If no, microcomputer 16 determines if N is then equal to P. If yes, the microcomputer makes N equal to full power and executes the zero crossing subroutine. If no, the microcomputer 16 makes N equal to P and executes the zero crossing subroutine. When N=P or N=full and the zero crossing subroutine is executed, N will not be equal to C and therefore the command "move C one towards N" in the zero crossing subroutine will be executed. Since the computational routine in FIG. 4(a) established N as a value which was not equal to the current value C of the light intensity level, the zero crossing subroutine will repeat itself until N=C (assuming no switches have been depressed in the meantime), at which time the level of light intensity will remain constant at the new level N. Thus, when N does not equal C in the zero crossing subroutine, an automatic fade mode is initiated which moves C one incremental value towards N each time the loop is repeated. This loop is executed a chosen number of times a second and by choosing that number or the magnitude of the incremental steps through which N moves, the designer may regulate the slope of the automatic fade mode. For example, if the increments of N are made very small it would take the completion of more loops to move C to the value of N (a slower fade) than it would if the incremental values of C were made larger (a faster fade). According to the preferred embodiment, each half cycle is divided into 160 incremental steps and the Z.C. subroutine is executed every third half cycle. This results in a fade in which the incremental increases or decreases in light intensity are imperceptible and the fade appears to be smooth and continuous.

If the up button is tapped while the automatic fade mode is in operation, a different set of conditions will exist at the first decision node in FIG. 4(a). In this case C will not be equal to N because N=P≠C and the microcomputer 16 will be in the process of fading C towards N. In such a case the microcomputer first determines if N is greater than or less than C. If N is greater than C, C is assigned a value that is equal to N. This causes the level of light intensity to abruptly jump from C to N. When the zero crossing subroutine is executed N will then be equal to C and the automatic fade mode will be circumvented as shown in FIG. 4. Thus, the difference between a fade and an abrupt transition lies in making C either equal to a new or desired level N or in making C equal to some value that is not N prior to execution of the zero crossing subroutine. For example, if N is not greater than C in FIG. 4(a), microcomputer 16 makes N equal to P, a preset level which is lower than C. Since N is then not equal to C at the commencement of the zero crossing subroutine, C moves one step at a time towards N which is lower than C, and a downward automatic fade is commenced.

The operation of the switch when the down button is tapped is similar in operation to the situation encountered when the up button is tapped. If no fade is in progress when the down button is tapped, C will be equal to N. Subsequently, N will be made equal to zero and the zero crossing subroutine will cause the light intensity level to fade to off. If a fade is in progress such that when the down button is tapped, N is either equal to, greater than, or less than C, the light either fades to off or makes an abrupt transition to off. A delay mode may be provided when a down fade is in progress to make downward fading more gradual than upward fading. Thus, if during a Z.C. subroutine a downward fade is detected, the microcomputer 16 delays the thyristor firing until the delay subroutine has been completed, incrementing the delay function one step at a time until its completion. If the down button is pressed while an up fade is in progress, N is made equal to zero and C fades toward N in the zero crossing subroutine. If the down is pushed while the system is fading towards off, N will be less than C and microcomputer 16 will make C equal to N which will cause the auto-fade mode in the zero crossing subroutine to be circumvented and the light will make an abrupt transition to off.

Figure 2:
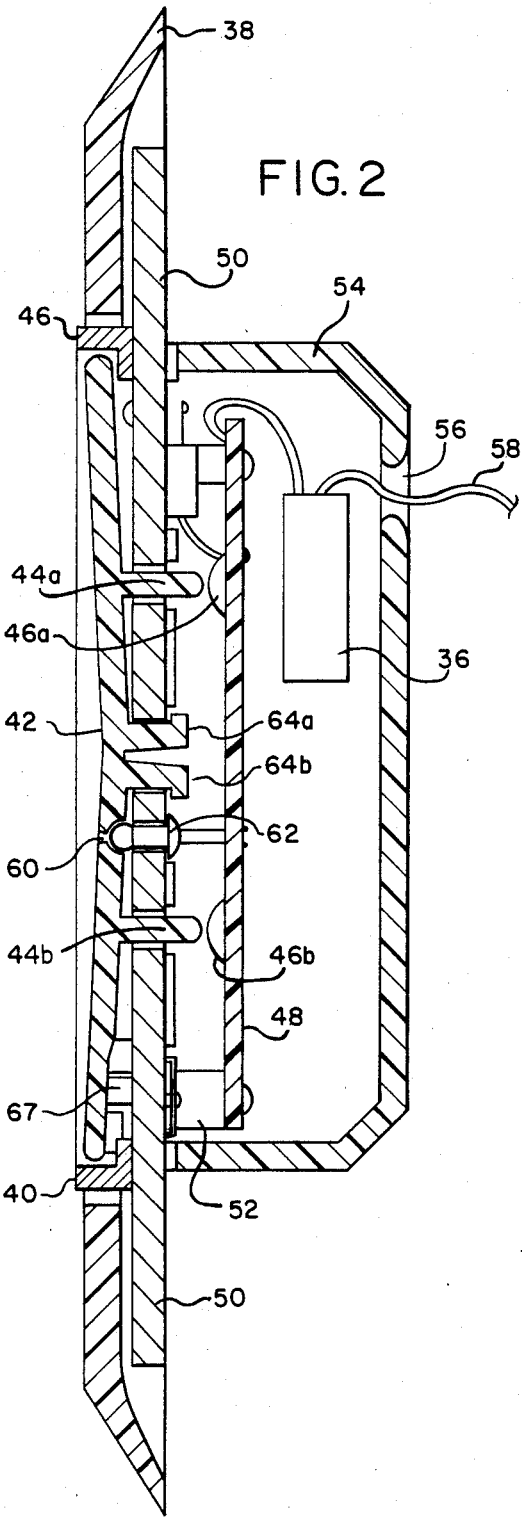
FIG. 2 is a side view of a wall switch mounting containing the circuit of the present invention illustrated in FIG. 1.

Physically the system represented in the block diagram of FIG. 1 may be enclosed in a wall mounted light switch. One example of such a switch is shown in the side view of the switch in FIG. 2. The switch of FIG. 2 includes a cover plate 38 and a rectangular bezel 40. The bezel 40 encloses a rocker mounted panel 42 which includes two inwardly extending fingers 44a and 44b. The fingers 44a and 44b are adapted to make contact with non-latching push buttons 46a and 46b. The push buttons 46a and 46b are mounted on a PC board 48 which also includes the circuit elements shown in the block diagram of FIG. 1 with the exception of the incandescent light source 10 and the AC power supply 12. The PC board 48 is mounted to an aluminum heat sink 50. An air gap safety switch 52 is also mounted to the heat sink which breaks the circuit when slider 67 is actuated. The switch components are enclosed in a box 54 of a size compatible with the current size standards for wall-mounted light switch boxes. Inside the box 54 is choke coil 36. An aperture 56 in box 54 provides a means for connection to the incandescent light source 10 by way of wire 58. The rocker panel 42 includes apertures 60 (only one such aperture is shown in FIG. 2) in which are mounted light-emitting diodes (LEDs) such as LED 62. LED 62 is part of LED display 26 identified in FIG. 1. There may be as many LEDs as desired. According to the preferred embodiment there should be eight because the National Semiconductor chip used for microcomputer 16 has eight outputs which may be arranged to provide a signal indicating the current level of light intensity. For example, the LEDs may be arranged in an array extending along the rocker panel 42 from top to bottom so that the vertical position in the array of the LED that is on indicates the level of brightness. The nonlatching push buttons 46a and 46b correspond functionally to switches 24a and 24b in FIG. 1. Thus, depressing the upper portion of the rocker panel 42 will cause finger 44a to engage push button 46a and close the "up" switch 24a. Similarly, depressing the lower half of rocker panel 42 will close "down" switch 24b. The rocker panel 42 is biased by a pair of angled legs 64a and 64b that fit snugly within an aperture in heat sink 50. The legs 64a and 64b cause the fingers 44a and 44b to release the push buttons 46a and 46b when there is no manual pressure on either half on the rocker panel 42.

Figure 3:
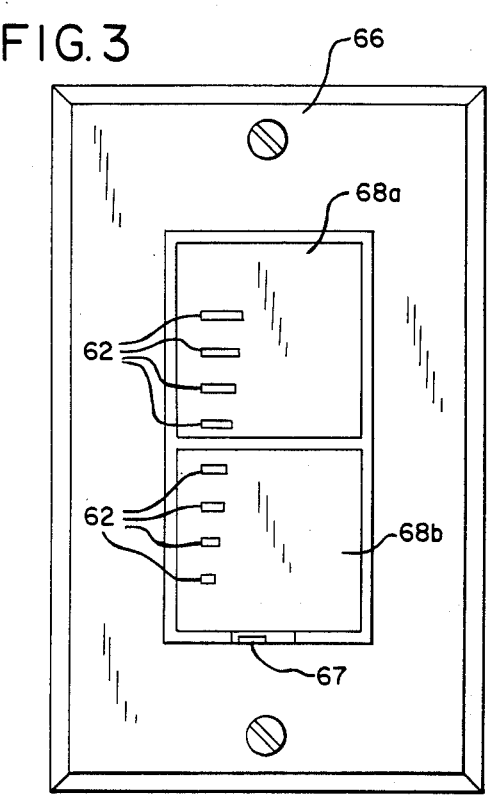
FIG. 3 is a front view of an alternate type of wall switch mounting.
Figure 3A:
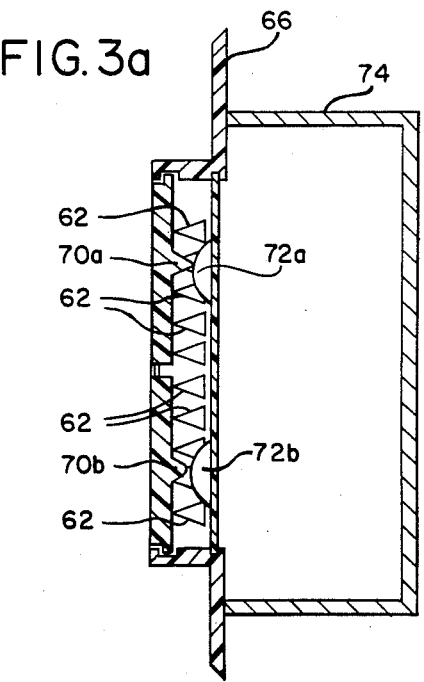
FIG. 3(a) is a side view of the wall switch mounting of FIG. 3.

An alternative embodiment of the wall mounting for FIG. 2 is shown in FIGS. 3 and 3a. The wall mounting of FIG. 3 includes a cover plate 66 and a two push plates 68a and 68b. LEDs 62 are arranged vertically from top to bottom through apertures in plates 68a and 68b, respectively. Each of the push plates 68a and 68b include inwardly protruding fingers 70a and 70b which engage pushbuttons 72a and 72b which are similar in all respects to pushbuttons 46a and 46b. The plates 68a and 68b are biased by a biasing means such as a spring (not shown). The electrical components of FIG. 1 are housed within a box 74 in a way similar to that depicted in FIG. 2.

Although non-latching switches are preferred, a center-off toggle switch (i.e., standard wall-mounted switch) could be used. The user must simply momentarily depress the switch in either direction and return it to center for a "tap" and hold it longer for a "hold."

In actual operation, pushing the up panel 68a or the upper half of rocker switch 42 when the light is off will cause the level of light intensity to rise and fade gradually towards the preset level. If the fade is in progress, tapping panel 68a or rocking switch 42 in the up position will cause the light to make an abrupt transition to the preset level. If up is pressed while the light is at the preset level the light will fade to a full power condition and if up is pressed while the light is fading to a full up condition the light will make an abrupt transition to full power. If down switch 68b or the lower half of rocker panel 42 is depressed, indicating a down switch condition, the light will fade towards off or zero. If down is pushed while a down fade is in progress, the light will make an abrupt transition to off. If, on the other hand, the up switch panel 68a or the upper portion of rocker panel 42 is pushed while a down fade is in progress, the light will fade to the preset level. Whenever panel 68a or 68b is held in one position for a period of more than transitory duration, the light level will move up or down stopping only when the panel is released. Simultaneously, the microcomputer 16 will store that current level of light intensity in memory as the preset level P.

This preset remains in memory until a subsequent holding of either of the switches to establish a new level.

If desired, the switching function may be divided between "tap" and "hold" and a second set of switches may be provided to take over one of the above functions. For example, a rocker panel could be dedicated to upward and downward taps and a second panel or toggle could provide the hold function for preset. Moreover, it is not necessary that the tap or hold functions depend on the time duration of the depression of the switches. If two sets of switches are used, the microcomputer 16 may be programmed to accept one set of switches at one input pin as the tap input and the second set as the hold, or preset, input on another pin regardless of length of time that either is held down.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A light level controller including a source of light connected to at least one control switch means having a depressed state and a non-depressed state comprising:
    (a) preset light intensity means for causing the light to assume a desired level of intensity when said control switch means remains in a depressed state for more than a period of transitory duration; and
    (b) automatic fading means for causing the light to fade towards said desired level of intensity when said switch is momentarily depressed.

2. The light level controller of claim 1, further including instantaneous light intensity transition means for causing the light to advance rapidly towards said desired level when said control switch means is momentarily depressed while the light is fading towards said desired level of intensity.

3. The light level controller of claim 1, said control switch means including two non-latching switches wherein a first one of said switches causes said automatic fading means to fade the light from a current intensity level to a brighter intensity level and a second one of said switches causes said automatic fading means to fade the light from said current intensity level to a dimmer intensity level.

4. The light level controller of claim 3 wherein said non-latching switches are actuated from a wall-mounted switch panel.

5. The light level controller of claim 4 further including a plurality of light emitting elements located on said wall-mounted switch panel for indicating a level of light intensity.

6. The light level controller of claim 5 wherein said light emitting elements are arranged in a linear array wherein the level of light intensity is indicated by the position in the linear array of an energized light emitting element.

7. The light level controller of claim 4 wherein said wall-mounted switch panel includes a dual-action panel having an upper segment for actuating said first switch and a lower segment for actuating said second switch wherein said dual-action panel is normally biased to a neutral position at which neither of said switches are in a depressed state.

8. The light level controller of claim 4, further including a remote control switch input connected through said wall mounted switch panel.

9. The light level controller of claim 1, further including microcomputer means for determining the period of time that said control switch is depressed and for actuating said preset light intensity means and said automatic fading means, respectively, as a function of said period of time.

10. The controller of claim 9 wherein said microcomputer means further includes memory means for storing in memory a preset signal representing the current intensity of said source of light when said control switch is released while said preset light intensity means is establishing said desired level of light intensity.

11. A light level controller including a source of light connected to at least one non-latching switch having a depressed state and a non-depressed state comprising:
   (a) signaling means responsive to said switch for providing an electrical signal, said signal continuing as long as said switch is in the depressed state;
   (b) microcomputer means for computing the duration of said signal and for initiating light intensity control modes in response thereto, including a preset mode for establishing a preset level of light intensity, and an automatic fade mode for fading a current level of light intensity towards a predetermined level of light intensity.

12. A light level controller as claimed in claim 11, further including synchronization means connected between a source of AC power and said microcomputer means for determining the zero crossing points of said AC power source to synchronize said microcomputer means with said AC power source.

13. The light level controller of claim 11, further including electronic switch means connected between said light source and said source of AC power said electronic switch means being responsive to pulses generated during said light intensity control modes, said pulses being generated at predetermined times relative to said zero crossing points.

14. The light level controller of claim 11 wherein said signaling means comprises pulse generating means for generating a sequential series of pulses as long as said switch is in a depressed state and wherein said microcomputer initiates said preset mode when more than n pulses are generated sequentially by said pulse means, where n is a predetermined number representing a period of time of more than transitory duration.

15. The light level controller of claim 14 wherein said microcomputer means includes means for comparing the preset level of light intensity, P, with a sampled level of light intensity, C, when less than n pulses are sequentially received, and for initiating said automatic fade mode in response to a condition including receipt of less than n pulses and $C \neq P$.

16. The light level controller of claim 15 wherein said microcomputer means includes means for abruptly advancing said light intensity level towards said preset level when said light source is fading towards said preset level and less than n pulses are sequentially received.

17. A light level controller, including a microcomputer for controlling a level of intensity of a source of light, said light level controller including at least one manually-operated switch comprising:
   (a) preset mode control means for establishing a preset level of light intensity;
   (b) automatic fade control means for automatically fading the level from a current level to a preset level; and
   (c) instantaneous mode control means for causing the level of light intensity to abruptly shift from a current level of intensity to a predetermined level of intensity when said manually-operated switch is actuated while said automatic fade mode control means is in operation.

18. The light level controller of claim 17 wherein said first switch condition comprises an operative condition for a first period of time and said second switch condition comprises an operative switch position for a second period of time where said second period of time is less than said first period of time.

19. The light level controller of claim 15 wherein said automatic fade mode control means is initiated by briefly actuating said manually-operated switch.

20. A light level controller including a source of light and an AC power source for powering said source of light and comprising control switch means interacting between said source of light, and said AC power source comprising means for initiating an automatic fade condition in said source of light when said control switch means is in first switch position and means for initiating a preset condition to preset said source of light to a chosen level when said control switch means is in a second switch position.

21. The light level controller of claim 20, further including remote control switch means wired in parallel with said control switch means for duplicating at a remote location the functions of said control switch means.

* * * * *